United States Patent
Shagaev et al.

(10) Patent No.: US 10,870,947 B2
(45) Date of Patent: Dec. 22, 2020

(54) PROCESS FOR ISOLATION OF HEMICELLULOSES FROM BIOMASS PULPING PROCESS WATERS OR SPENT LIQUORS

(71) Applicant: Andritz AG, Graz (AT)

(72) Inventors: Oleg Shagaev, Vienna (AT); Lukas Wiesegger, Graz (AT)

(73) Assignee: Andritz AG, Graz (AT)

( * ) Notice: Subject to any disclaimer, the term of this patent is extended or adjusted under 35 U.S.C. 154(b) by 64 days.

(21) Appl. No.: 16/326,769

(22) PCT Filed: Jul. 27, 2017

(86) PCT No.: PCT/EP2017/069032
§ 371 (c)(1),
(2) Date: Feb. 20, 2019

(87) PCT Pub. No.: WO2018/041488
PCT Pub. Date: Mar. 8, 2018

(65) Prior Publication Data
US 2019/0203416 A1  Jul. 4, 2019

(30) Foreign Application Priority Data
Sep. 2, 2016 (AT) .............................. A 50780/2016

(51) Int. Cl.
*D21C 11/00* (2006.01)
*D21C 11/04* (2006.01)
*D21C 11/10* (2006.01)

(52) U.S. Cl.
CPC ...... *D21C 11/0007* (2013.01); *D21C 11/0042* (2013.01); *D21C 11/04* (2013.01); *D21C 11/10* (2013.01)

(58) Field of Classification Search
CPC .................. D21C 11/0007; D21C 11/0042
See application file for complete search history.

(56) References Cited

U.S. PATENT DOCUMENTS

| 4,470,876 A | 9/1984 | Beaupre et al. |
| 2012/0196233 A1 | 8/2012 | Ni et al. |

(Continued)

FOREIGN PATENT DOCUMENTS

| WO | 0240767 A1 | 5/2002 |
| WO | 2004013409 A1 | 2/2004 |

OTHER PUBLICATIONS

Deng et al., Derwent Summary of CN 103333274B Oct. 2013 (Year: 2013).*

(Continued)

*Primary Examiner* — Anthony Calandra
(74) *Attorney, Agent, or Firm* — Alix, Yale & Ristas, LLP

(57) ABSTRACT

The invention relates to a process for isolation of hemicelluloses from biomass pulping process waters or spent liquors with removal of suspended solids, concentration of the product and purification of the product by removal of inorganic salts and low molecular weight substances. It is characterized in that the hemicellulose isolation process conditions at several separation/purification stages are adjusted separately by e.g. pH adjustment. The invention further relates to a plant for carrying out the process. With such process and plant it is possible to recover most of the suspended solids, especially xylan and other hemicelluloses.

12 Claims, 1 Drawing Sheet

(56) References Cited

U.S. PATENT DOCUMENTS

| | | | |
|---|---|---|---|
| 2013/0115653 A1* | 5/2013 | Peterson | C07D 307/50 |
| | | | 435/41 |
| 2014/0163245 A1 | 6/2014 | Lake et al. | |
| 2017/0215471 A1* | 8/2017 | Junker | A24B 15/287 |
| 2019/0249363 A1* | 8/2019 | Frick | D21C 1/04 |

OTHER PUBLICATIONS

International Search Report and Written Opinion dated Sep. 18, 2017 for International Patent Application No. PCT/EP2017/069032.
International Preliminary Report on Patentability dated Nov. 30, 2018 for International Patent Application No. PCT/EP2017/069032.

* cited by examiner

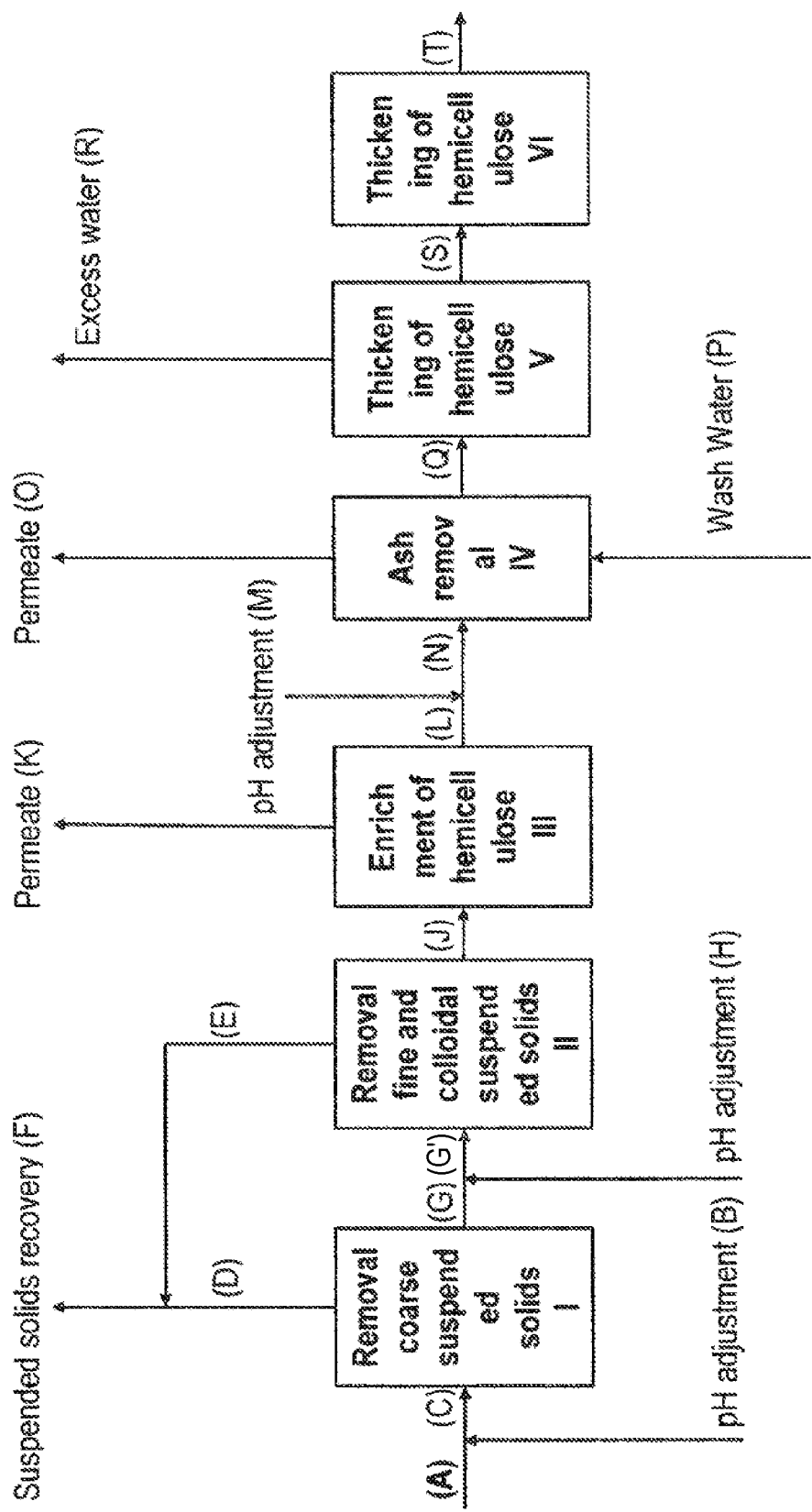

PROCESS FOR ISOLATION OF HEMICELLULOSES FROM BIOMASS PULPING PROCESS WATERS OR SPENT LIQUORS

BACKGROUND

Disclosed herein is a process for isolation of hemicelluloses from biomass pulping process waters and spent liquors with removal of suspended solids, concentration of the product and purification of the product by removal of inorganic salts and low molecular weight substances.

Significant efforts to develop processes for isolation of valuable bio-products from biomass pulping process waters (TMP white water, bleaching pressates) and spent liquors (alkaline pre-hydrolysis, alkaline extraction of Kraft pulps for dissolving pulp grades) have been executed in the past couple of decades, particularly isolation of lignin and hemicelluloses. However, conventionally, extracted polymeric hemicelluloses (e.g. xylooligosaccharides (XOS)) are further converted into sugars, which are either converted into biofuels (e.g. ethanol), or other alkaline chemicals, like succinic and lactic acids that are further used in chemical industry for polymer synthesis (e.g. polylactic acid (PLA)). For concentration of the effluent the throughput (flux) was very low in ultrafiltration process. So approx. 1-3% solids content could be achieved with a throughput of only 10-15 $l/m^2$ h, or less by the time this concentration could be reached. Such process could not be turned into industrial use due to the big ultrafiltration equipment necessary and the still relatively low concentration of the product, especially for a further thermal concentration and/or treatment. Such low throughput is mainly due to fouling of the ultrafiltration units.

Processes with pH adjustment of an effluent stream or of black liquor are known from US 2014/0163245 where a process for producing furfural from black liquor is described. Further in U.S. Pat. No. 4,470,876 a kraft overload recovery process is described where lignin is separated and residual sugar acids are burnt in a furnace. WO 2004/013409 describes a further method for treating black liquor with pH adjustment and precipitation of the solids mainly lignin.

SUMMARY

Disclosed herein is a hemicellulose isolation process conditions at several separation/purification stages are adjusted separately by pH adjustment, where the pH value of the clear fluid stream after removal of coarse suspended solids is adjusted to pH 8-11, preferably pH 9.0-9.5, whereby the pH value of the incoming effluent stream is adjusted to pH 8-11 and before removal of inorganic salts the pH value is adjusted to 4.0-4.5. By these means it is possible to achieve high flux flow throughput rates and product concentrations while each stage can work at its optimal conditions and the fouling of filter surfaces, especially membranes, is reduced significantly, a good separation of fibers, suspended solids and hemicelluloses is possible and such pH adjustment allows that no sodium ions are bound to the hemicellulose and thus can be separated easily.

By utilizing the disclosed process, the final product enriched with hemicellulose after separation of ashes has a dryness of 15-30%. This allows cheaper thermal isolation treatment afterwards.

BRIEF DESCRIPTION OF THE DRAWING

The block diagram in FIG. 1 shows the typical setup of the preferred process.

DETAILED DESCRIPTION

This process for isolation of hemicelluloses can be used for mechanical pulping lines, semi-chemical and chemical pulping plants. It can be implemented in either existing installations or rebuild projects. The process applies for biomass, hardwood (xylans) and softwoods (galactoglucomannans (GGM)) pulping lines process waters and spent liquors treatment where alkaline treatment or high temperature water extraction of biomass is used.

Typical pulping lines for isolation of hemicelluloses from process waters, bleach plants and spent liquors are:
Hardwood Kraft mills with alkaline pre-hydrolysis
Hardwood Kraft mills with alkaline extraction stage before, or after bleaching
Hardwood NSSC semi chemical pulping lines
Hardwood green liquor semi-chemical pulping lines
Annual plants mechanical and semi-chemical pulping lines (bagasse, kenaf, etc.)
TMP process white water
APMP hardwood lines
BCTMP hardwood pulping lines.

The incoming stream A in FIG. 1 can be any effluent of any mechanical or semi-chemical pulping line containing hemicellulose, which can be e.g. white water or pressate, or filtrate, or black liquor from pulp washing equipment normally at a temperature of e.g. 60-90° C. The incoming stream A loaded with a high amount of COD (chemical oxygen demand) as "effluent" is usually sent to an effluent treatment station, which is the current state-of-the-art.

For the process according to the invention the pH is adjusted to pH 8-11 by stream B. After the first pH adjustment—stream C—containing coarse suspended solids, such as fibers and fiber particles and particles greater than >10 µm that are not retained during washing are removed in the first process step I, whereby some separation equipment allows to remove particles greater than >5 µm.

Process step I can be performed by mechanical separation equipment such as filtration units or centrifuges (e.g. decanter centrifuge). The necessity to use for example a decanter centrifuge is suitable for the APMP lines without existing fiber recovery system (e.g. fiber recovery disc filter) that is capable to remove fiber fragments, fines and other suspended solids from screw press pressate after an alkaline peroxide bleaching stage. In this case, the decanter centrifuge is used to remove suspended solids. For the APMP lines with existing fiber recovery system (e.g. having the fiber recovery disc filter) that is capable to remove efficiently fiber fragments, fines and other suspended solids from pulp washing equipment (e.g. screw press) pressate after alkaline peroxide bleaching stage the usage of decanter centrifuge is optional, or can be eliminated.

The clear fluid (stream G) from coarse suspended solids removed in process step I, e.g. either by a disc filter or decanter centrifuge, the effluent is collected in a buffer tank where the pH value of this spent liquor is adjusted to pH 8-11 (more advantageously to pH 9.0-9.5) by stream H—to dissolve the high molecular weight hemicelluloses, that tend to coagulate and/or absorb on high specific surface fines/particles at pH <6-7 after a neutralization stage that is typically performed after the bleaching stage in APMP/BCTMP processes. In some applications adjustment of the pH value may only be done with adding the basic chemicals in stream B, in other applications chemical addition to get to pH 8-11, preferably 9.0-9.5, can be done in stream H. However it is possible also to add chemicals in both streams B and H depending on the characteristics of the effluent and of the separation equipment.

After high molecular weight hemicelluloses are desorbed and re-dissolved, this fraction is transferred to the liquid phase of the effluent—stream G'—and is sent to process step II, where smaller particles in the range of >0.5-10 μm are removed, e.g. very fine biomass material and colloidal suspended solids (e.g. silicates, resins).

For process step II, machines and equipment such as centrifugal disc separators (or other type of separators), or membrane type micro filtration units can be used.

After thorough suspended solids and colloidal substances removal after process steps I and II, the effluent J is sent to process step III, in which the hemicelluloses are enriched.

The reject streams of process step I—stream D—and of process step II—stream E, containing fibers and other suspended solids down to approx. 0.5 μm particle size, are collected and can be sent back to the system (mechanical or semi-chemical pulping line or pulp and paper mill)—stream F.

In process step III—usually ultrafiltration membrane units are used and most of the water, salts and low molecular organics are removed and the effluent/product is concentrated to a factor of 10-20. The permeate of this process step—stream K—having much less COD (chemical oxygen demand) than stream A thus can be reused in the system (mechanical or semi-chemical pulping line or pulp and paper mill).

Following process step III the pH of the concentrated liquor/effluent L is adjusted by stream M and the resulting stream N is passed through to the next process step IV, which is a membrane unit—usually diafiltration, where stream N is washed by fresh water or process condensate—stream P and inorganic salts (mostly sodium) are removed to the required product quality level and the product is concentrated further to the level of solids content sufficient for the next process step(s). Considering that most of hemicelluloses (e.g. xylans) contain uronic acids as side chains which are relatively acidic and contain sodium ions bound by COO$^-$— groups, the pH of stream L is adjusted to pH 4.0-4.5 by acid, e.g. sulfuric acid, hydrochloric acid etc. by stream M in order to have more efficient removal of bound sodium ions (Na$^+$) and, correspondingly, reduce the product ash content further if required.

Process step IV is able to produce the product (stream Q) at 20-30% solids concentration. Process step IV generates excess water/permeate O, which can be used for dilution or any further use in the system (mechanical or semi-chemical pulping line or pulp and paper mill) to substitute fresh water or any mill water. The out coming stream Q of process step IV is further processed in process step V, where the hemicelluloses are thickened further up to a solid concentration of 50-80%. Process step (V) can usually be a thermal separation process such as evaporation, which generates excess water of high quality, typically condensate, —stream R, which can be used for the diafiltration stage (step IV), dilution or any further use in the system (mechanical or semi-chemical pulping line or pulp and paper mill) to substitute fresh water or any mill water. The heating of the thermal drying unit may be achieved by waste steam from the mill. The out coming stream S of process step V can be used as a product or depending on the final product concentration requirements (e.g. 80-90% dry solids) is thickened further in another process step VI, which can be a drying unit, e.g. spray dryer. The final product enriched with hemicellulose encompasses a dryness level of 50-80% as slurry/suspension, paste or gel—stream S or if necessary around 80-90% as powder—stream T.

The invention is not limited to the drawing but the process may also already end after process step IV when the stream may be further used in the system. Also excess water (stream R) of process step V may be reused instead of fresh water for stream P of process step IV.

The invention claimed is:

1. Process for isolation of hemicelluloses from biomass pulping process waters or spent liquors with removal of suspended solids, comprising the steps of:
   (a) providing an incoming stream (A) containing hemicellulose and coarse suspended solids having a size greater than 10 microns, fine suspended solids having a size within a range of 5-10 microns and colloidal substances, the incoming stream (A) having a pH;
   (b) adjusting the pH of the incoming stream (A) to yield a pH-adjusted incoming stream (C) having a pH within a range of 8-11;
   (c) feeding the pH-adjusted incoming stream (C) to a filtration unit for removal of coarse suspended solids (I) to produce a clear fluid stream (G) having a pH;
   (d) adjusting the pH of the clear fluid stream (G) to a pH within the range of 8-11 to dissolve hemicelluloses to form a fraction (G') having dissolved inorganic salts;
   (e) removing fine solid particles having a size within a range of 5-10 microns and colloidal substances from the fraction (G') to form an alternate fraction (J);
   (f) enriching hemicelluloses in the alternate fraction (J) to form a concentrate (L);
   (g) adjusting the pH of the concentrate (L) to a pH within a range of 4.0-4.5 to form a stream (N) having inorganic salts; and
   (h) removing inorganic salts from the stream (N) to form a final product.

2. The process of claim 1, wherein the final product after step (h) has a dryness of 15-30%.

3. The process of claim 2, wherein the pH-adjusted incoming stream (C) has a pH within a range of 9.0-9.5.

4. The process of claim 2, wherein hemicelluloses that are dissolved in step (d) are hemicelluloses that are precipitated on fine suspended solids.

5. The process of claim 4, wherein the final product after step (h) has a dryness of 15-30%.

6. The process of claim 5, wherein the pH-adjusted incoming stream (C) has a pH within a range of 9.0-9.5.

7. The process of claim 4, wherein the pH-adjusted incoming stream (C) has a pH within a range of 9.0-9.5.

8. The process of claim 2, wherein the fine solid particles having a size within a range of 5-10 micron are removed via a decanter centrifuge.

9. The process of claim 1, wherein the pH-adjusted incoming stream (C) has a pH within a range of 9.0-9.5.

10. The process of claim 9, wherein hem icelluloses that are dissolved in step (d) are hemicelluloses that are precipitated on fine suspended solids.

11. The process of claim 1, wherein hemicelluloses that are dissolved in step (d) are hemicelluloses that are precipitated on fine suspended solids.

12. The process of claim 1, wherein the fine solid particles having a size within a range of 5-10 micron are removed via a decanter centrifuge.

* * * * *